United States Patent
Zhou et al.

(10) Patent No.: US 11,847,619 B2
(45) Date of Patent: Dec. 19, 2023

(54) SYSTEM-STATE MONITORING METHOD AND DEVICE AND STORAGE MEDIUM

(71) Applicant: Siemens Ltd., China, Beijing (CN)

(72) Inventors: Lin Fei Zhou, Beijing (CN); Xiao Liang, Beijing (CN); Jing Li, Beijing (CN); Daniel Schneegass, Munich (DE)

(73) Assignee: SIEMENS LTD., CHINA, Beijing (CN)

( * ) Notice: Subject to any disclaimer, the term of this patent is extended or adjusted under 35 U.S.C. 154(b) by 124 days.

(21) Appl. No.: 17/277,770

(22) PCT Filed: Sep. 10, 2019

(86) PCT No.: PCT/CN2019/105232
§ 371 (c)(1),
(2) Date: Mar. 19, 2021

(87) PCT Pub. No.: WO2020/057402
PCT Pub. Date: Mar. 26, 2020

(65) Prior Publication Data
US 2021/0286695 A1    Sep. 16, 2021

(30) Foreign Application Priority Data
Sep. 20, 2018    (CN) .......................... 201811103227.3

(51) Int. Cl.
*G06F 11/00* (2006.01)
*G06Q 10/20* (2023.01)
(Continued)

(52) U.S. Cl.
CPC ......... *G06Q 10/20* (2013.01); *G06F 11/0706* (2013.01); *G06F 11/0772* (2013.01);
(Continued)

(58) Field of Classification Search
CPC ............. G06F 11/0703; G06F 11/0706; G06F 11/0766; G06F 11/0772; G06F 11/0787;
(Continued)

(56) References Cited

U.S. PATENT DOCUMENTS 4,607,346 A * 8/1986 Hill ........................ G06F 3/0601
711/170
8,566,549 B1 * 10/2013 Burke .................... G06F 3/0644
711/114
(Continued)

FOREIGN PATENT DOCUMENTS

CN    101251441 A    8/2008
CN    103245912 A    8/2013
(Continued)

OTHER PUBLICATIONS

E. S. Buneci and D. A. Reed, "Analysis of application heartbeats: Learning structural and temporal features in time series data for identification of performance problems," SC '08: Proceedings of the 2008 ACM/IEEE Conference on Supercomputing, 2008, pp. 1-12, doi: 10.1109/SC.2008.5219753. (Year: 2008).*
(Continued)

*Primary Examiner* — Anthony J Amoroso
(74) *Attorney, Agent, or Firm* — Harness, Dickey & Pierce, P.L.C.

(57) ABSTRACT

At least some example embodiments provide a system-state monitoring method and device and a storage medium. The method includes determining a standard operation mode of a system, the standard operation mode including a plurality of operation states of the system in a unit time period. The method further includes determining, according to current operation data of the system, a current operation mode of the system and determining, by comparing the current operation mode with the standard operation mode, whether or not the system is in the standard operation mode. The plurality of
(Continued)

operation states of the system are determined to be the standard operation mode, such that changes in system operation patterns can be readily detected, thereby facilitating a timely adjustment of the monitored system or peripheral mechanisms in cooperation therewith and improving system performance.

16 Claims, 6 Drawing Sheets

(51) Int. Cl.
| | | |
|---|---|---|
| *G06F 16/901* | (2019.01) | |
| *G06F 11/07* | (2006.01) | |
| *G06F 11/30* | (2006.01) | |
| *G06F 11/32* | (2006.01) | |
| *G06F 18/22* | (2023.01) | |

(52) U.S. Cl.
CPC ...... *G06F 11/0787* (2013.01); *G06F 11/3003* (2013.01); *G06F 11/3055* (2013.01); *G06F 11/3058* (2013.01); *G06F 11/3079* (2013.01); *G06F 11/32* (2013.01); *G06F 16/9024* (2019.01); *G06F 18/22* (2023.01)

(58) Field of Classification Search
CPC .. G06F 11/30; G06F 11/3003; G06F 11/3055; G06F 11/3058; G06F 11/3065; G06F 11/3072; G06F 11/3075; G06F 11/3079; G06F 11/32; G06F 11/322; G06F 11/323; G06F 11/328; G06F 16/9024; G06F 18/22; G06Q 10/20
See application file for complete search history.

(56) References Cited

U.S. PATENT DOCUMENTS

| | | | | |
|---|---|---|---|---|
| 10,419,469 | B1* | 9/2019 | Singh | ................... H04L 67/535 |
| 2011/0029817 | A1* | 2/2011 | Nakagawa | .......... G06F 11/0709 |
| | | | | 714/E11.029 |
| 2015/0100534 | A1 | 4/2015 | Ohtani et al. | |
| 2015/0293719 | A1* | 10/2015 | Luo | ......................... G06F 3/065 |
| | | | | 711/170 |
| 2016/0162383 | A1 | 6/2016 | Blöcher et al. | |
| 2017/0075749 | A1* | 3/2017 | Ambichl | ............. G06F 11/3072 |
| 2018/0210803 | A1* | 7/2018 | Kobayashi | .......... G06F 11/3409 |
| 2020/0218217 | A1* | 7/2020 | Li | ....................... G06F 11/3058 |

FOREIGN PATENT DOCUMENTS

| | | | | |
|---|---|---|---|---|
| CN | 104517027 | A | | 4/2015 |
| CN | 106447206 | A | | 2/2017 |
| CN | 106656368 | A | | 5/2017 |
| CN | 106779200 | A | | 5/2017 |
| CN | 107203746 | A | | 9/2017 |
| CN | 105372591 | B | | 2/2018 |
| CN | 107814288 | A | | 3/2018 |
| CN | 108121640 | B * | 8/2021 | .......... G06F 11/3017 |
| JP | 2016050830 | A | | 4/2016 |
| WO | WO 2015110873 | A1 | | 7/2015 |
| WO | WO 2020057402 | A1 | | 3/2020 |

OTHER PUBLICATIONS

B. Agrawal, T. Wiktorski and C. Rong, "Adaptive Anomaly Detection in Cloud Using Robust and Scalable Principal Component Analysis," 2016 15th International Symposium on Parallel and Distributed Computing (ISPDC), 2016, pp. 100-106, doi: 10.1109/ISPDC.2016.22. (Year: 2016).*

K. Viswanathan, L. Choudur, V. Talwar, C. Wang, G. Macdonald and W. Satterfield, "Ranking anomalies in data centers," 2012 IEEE Network Operations and Management Symposium, 2012, pp. 79-87, doi: 10.1109/NOMS.2012.6211885. (Year: 2012).*

Khurana, Udayan, and Amol Deshpande. "Storing and analyzing historical graph data at scale." arXiv preprint arXiv: 1509.08960 (2015). (Year: 2015).*

International Search Report and Written Opinion dated Dec. 9, 2019.

Chinese Office Action dated Jan. 20, 2021.

* cited by examiner

SYSTEM-STATE MONITORING METHOD AND DEVICE AND STORAGE MEDIUM

PRIORITY STATEMENT

This application is the national phase under 35 U.S.C. § 371 of PCT International Application No. PCT/CN2019/105232 which has an International filing date of Sep. 10, 2019, which designated the United States of America and which claims priority to Chinese patent application number CN 201811103227.3 filed Sep. 20, 2018, the entire contents of each of which are hereby incorporated herein by reference.

FIELD

At least some example embodiments to the field of information processing, in particular to a system-state monitoring method, device, and storage medium.

BACKGROUND ART

A present system-state monitoring mechanism usually collects running parameter values of a system, judges whether the running parameter values fall within a normal range and provides a monitoring result of whether the system state is normal according to the judgment result.

SUMMARY

In reality, even when running parameter values may still be within the normal range, a change in a running rule of the system, for example, performance degradation due to equipment aging or a change in a running rule of the system caused by process reformation, may occur. It is also necessary to discover such changes in a timely manner to allow adjustment of related supporting services, such as equipment maintenance and energy configuration.

In view of the above-described problem, at least some example embodiments propose a system-state monitoring method, device, and storage medium, which can detect a change in a running rule of a system.

At least one example embodiment provides a system-state monitoring method. The method includes determining a reference running mode of a system, the reference running mode including a plurality of running states of the system within a unit time period, determining a current running mode of the system according to current running data of the system and determining whether the system is in the reference running mode or not by comparing the current running mode and the reference running mode.

At least one example embodiment provides a system-state monitoring device. The device includes a reference mode determining module configured to determine a reference running mode of a system, the reference running mode including a plurality of running states of the system within a unit time period, a current mode determining module configured to determine a current running mode of the system according to current running data of the system and a judging module configured to determine whether the system is in the reference running mode or not by comparing the current running mode and the reference running mode.

At least one example embodiment provides a system-state monitoring device. The device includes at least one processor and a storage, the storage storing a computer-readable instruction, when executed by the at least one processor, causes the at least one processor to execute a system-state monitoring method described herein.

At least one example embodiment provides a computer-readable storage medium storing a computer-readable instruction, when executed by at least one processor, causes the at least one processor to execute a system-state monitoring method described herein.

BRIEF DESCRIPTION OF THE DRAWINGS

Preferred embodiments of at least some example embodiments will be described in detail below with reference to the drawings to make the above-mentioned and other characteristics and benefits of example embodiments clearer to those of ordinary skill in the art. In the drawings.

DETAILED DESCRIPTION

Figure 1:
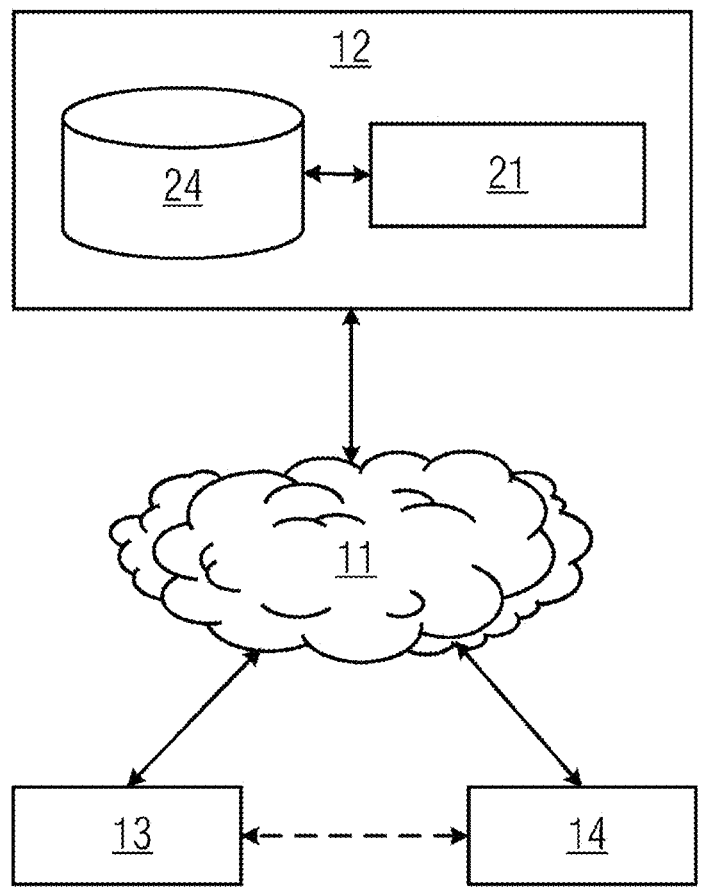
FIG. 1 shows a schematic diagram for an application scenario of at least one embodiment of the present application.

At least one example embodiment provides a system-state monitoring method, which may comprise:

determining a reference running mode of a system, wherein the reference running mode comprises a plurality of running states of the system within a unit time period;

determining a current running mode of the system according to current running data of the system; and determining whether the system is in the reference running mode or not by comparing the current running mode and the reference running mode.

With this method, by determining a plurality of usual running states of a monitored system as a reference running mode, a change in a running rule of the system may be detected; therefore, the monitored system or a peripheral matched mechanism may be adjusted conveniently in a timely manner, and performance of the system is improved.

In some embodiments, the reference running mode comprises a plurality of first state distribution graphs corresponding to the plurality of running states, and the current running mode comprises at least one second state distribution graph;

wherein the step of determining whether the system is in the reference running mode or not by comparing the current running mode and the reference running mode may comprise:

using the plurality of first state distribution graphs as a first graph group, using the at least one second state distribution graph as a second graph group, determining a similarity measuring value of the first graph group and the second graph group, and determining whether the system is in the reference running mode or not according to the similarity measuring value.

By transforming the comparison between a current running mode and a reference running mode into comparison of the similarity between two groups of graphs, various graph processing methods may be used to determine whether the system is in the reference running mode.

In some embodiments, determining a similarity measuring value of the first graph group and the second graph group may comprise:

determining a third state distribution graph most similar to the second state distribution graph in the first graph group for each second state distribution graph in the second graph group, calculating a graph similarity measuring value of the second state distribution graph and the third state distribution graph, and obtaining a measuring value set corresponding to the second graph group according to the graph similarity measuring value; and determining a similarity measuring value of the first graph group and the second graph group by using the measuring value set.

By determining the graphs in the second graph group that are most similar in the first graph group, and determining the closeness of each running state graph in the current running mode to the reference running mode according to its graph similarity measuring value, the computational complexity may be greatly reduced.

In some embodiments, the step of determining a similarity measuring value of the first graph group and the second graph group by using the measuring value set comprises one of the following:

selecting an extreme value in the measuring value set as the similarity measuring value of the first graph group and the second graph group;

selecting a plurality of values from the measuring value set, and using the mean value of the plurality of values as the similarity measuring value of the first graph group and the second graph group; and selecting a plurality of values from the measuring value set, and using the sum of the plurality of values as the similarity measuring value of the first graph group and the second graph group.

By selecting some values from a measuring value set to determine the similarity measuring value between a first graph group and a second graph group, the computational complexity may be further reduced, and the computation efficiency may be improved.

In some embodiments, the method may further comprise at least one of the following:

determining a first weight of each first state distribution graph in the plurality of first state distribution graphs; and determining a second weight of each second state distribution graph in the at least one second state distribution graph according to the current running data;

wherein the step of determining whether the system is in the reference running mode or not by comparing the current running mode and the reference running mode comprises:

determining a third state distribution graph most similar to the second state distribution graph in the first graph group for each second state distribution graph in the second graph group, calculating a graph similarity measuring value of the second state distribution graph and the third state distribution graph, and obtaining a measuring value set corresponding to the second graph group according to the graph similarity measuring value; and determining whether the system is in the reference running mode or not according to the measuring value set and the first weight and/or the second weight.

By taking the weight of each running state into consideration, a more accurate judgment result may be obtained.

In some embodiments, the step of determining whether the system is in the reference running mode or not according to the measuring value set and the first weight and/or the second weight comprises one of the following:

weighting each value in the measuring value set with the first weight and/or the second weight to obtain a weighted value of each value, and determining whether the system is in the reference running mode according to the extreme value in the weighted values;

selecting a plurality of values from the measuring value set, calculating a weighted average of the plurality of values according to the first weight and/or the second weight, and determining whether the system is in the reference running mode according to the weighted average; and selecting a plurality of values from the measuring value set, calculating a weighted sum of the plurality of values according to the first weight and/or the second weight, and determining whether the system is in the reference running mode according to the weighted sum.

Thus, when judging whether a system is in the reference running mode, the probability of creation of each running state in the current running mode and the reference running mode may be considered, so that a more accurate judgment result may be obtained.

In some embodiments, the method may further comprise one of the following:

determining time information corresponding to each running state in the plurality of running states, and determining whether the system is in the reference running mode or not by comparing state characteristics and time information of the plurality of running states and the current running mode;

determining a reference running mode corresponding to each preset time period, and determining whether the system is in the reference running mode or not by comparing the current running mode and the reference running mode corresponding to the same time period; and determining a time distribution rule of a system parameter value of the system, determining a time distribution condition of the system parameter value according to the current running data, and determining whether the system is in the reference running mode or not according to whether the time distribution condition conforms to the time distribution rule or not.

By comparing the time information of the current running mode with the time information of the running state in the reference running mode, any irregularity of the system running state in time may be detected, so as to facilitate the handling of irregular running of the system.

In some embodiments, the method may further comprise:
acquiring running data of the system, and storing the running data in a first storage space and a second storage space respectively, the first storage space being greater than the second storage space;

when it is determined that the system is not in the reference running mode, sending out alarming information, and emptying the first storage space;

wherein the step of determining the reference running mode of the system and determining the current running mode of the system according to the current running data of the system comprises:

when the first storage space is full, stopping storing the running data into the first storage space, and determining the reference running mode according to the running data in the first storage space; and when the second storage space is full and the reference running mode exists, determining the current running mode by utilizing the running data in the second storage space.

By storing historical running data and current running data in two storage spaces of different sizes respectively and, when a storage space has become full, triggering the determination process of the corresponding running mode, no timer needs to be used and thus the implementation is simpler.

In some embodiments, the step of determining a reference running mode of a system may comprise one of the following:

clustering a plurality of running state examples corresponding to the unit time period in historical running data of the system to obtain a plurality of clusters, and calculating a running state for each cluster in the plurality of clusters to serve as one running state in the plurality of running states; and building a matrix by utilizing the plurality of running state examples corresponding to the unit time period in the historical running data of the system, and performing dimensionality reduction on the matrix by utilizing singular value decomposition or main component analysis to obtain the plurality of running states.

After the above-described processing, a large number of running state instances may be simplified into a few running states, which facilitates the subsequent comparison with the current running mode and allows a reduction in the implementation complexity.

At least some embodiments further provide a system-state monitoring device, which may comprise:

a reference mode determining module, used for determining a reference running mode of a system, wherein the reference running mode comprises a plurality of running states of the system within a unit time period;

a current mode determining module, used for determining a current running mode of the system according to current running data of the system; and a judging module, used for determining whether the system is in the reference running mode or not by comparing the current running mode and the reference running mode.

A system-state monitoring device of at least some embodiments determines a plurality of usual running states of a monitored system as a reference running mode and, by comparing the current running mode of the system with the reference running mode, determines whether the system is in the reference running mode; thus, a change in a running rule of the system may be detected; therefore, the monitored system or a peripheral matched mechanism may be adjusted conveniently in a timely manner, and performance of the system is improved.

In some embodiments, the judging module may comprise:

a similarity determining unit, using a plurality of first state distribution graphs corresponding to the plurality of running states as a first graph group, using at least one second state distribution graph corresponding to the current running mode as a second graph group, and determining a similarity measuring value of the first graph group and the second graph group; and a judging unit, used for determining whether the system is in the reference running mode or not according to the similarity measuring value.

Thus, by transforming the comparison between a current running mode and a reference running mode into the comparison of similarity between two groups of graphs, the system-state monitoring device can use various graph processing methods to determine whether the system is in the reference running mode, which is relatively simpler to implement.

In some embodiments, the similarity determining unit is used for determining a third state distribution graph most similar to the second state distribution graph in the first graph group for each second state distribution graph in the second graph group, calculating a graph similarity measuring value of the second state distribution graph and the third state distribution graph, and obtaining a measuring value set corresponding to the second graph group according to the graph similarity measuring value; and determining a similarity measuring value of the first graph group and the second graph group by using the measuring value set.

By determining the graphs in the second graph group that are most similar in the first graph group, and determining the closeness of each running state graph in the current running mode to the reference running mode according to its graph similarity measuring value, the computation load on the similarity determining unit is reduced.

In some embodiments, the judging unit is used for executing one of the following:

selecting an extreme value in the measuring value set as the similarity measuring value of the first graph group and the second graph group;

selecting a plurality of values from the measuring value set, and using the mean value of the plurality of values as the similarity measuring value of the first graph group and the second graph group; and selecting a plurality of values from the measuring value set, and using the sum of the plurality of values as the similarity measuring value of the first graph group and the second graph group.

By selecting some values from the measuring value set to determine the similarity measuring value of the first graph group and the second graph group, the computation load on the system-state monitoring device may be further reduced and the computation efficiency may be improved.

In some embodiments, the reference mode determining module is further used for determining a first weight of each first state distribution graph in the plurality of first state distribution graphs according to historical running data; or the current mode determining module may be further used for determining a second weight of each second state distribution graph in the at least one second state distribution graph according to the current running data, wherein the judging module may be further used for determining a third state distribution graph most similar to the second state distribution graph in the first graph group for each second state distribution graph in the second graph group, calculating a graph similarity measuring value of the second state distribution graph and the third state distribution graph, and obtaining a measuring value set corresponding to the second graph group according to the graph similarity measuring value; and determining whether the system is in the reference running mode or not according to the measuring value set and the first weight and/or the second weight.

By taking the weight of each running state into consideration, the judging module may obtain a more accurate judgment result.

In some embodiments, the judging module can execute one of the following:

- weighting each value in the measuring value set with the first weight and/or the second weight to obtain a weighted value of each value, and determining whether the system is in the reference running mode according to the extreme value in the weighted values;
- selecting a plurality of values from the measuring value set, calculating a weighted average of the plurality of values according to the first weight and/or the second weight, and determining whether the system is in the reference running mode according to the weighted average; and
- selecting a plurality of values from the measuring value set, calculating a weighted sum of the plurality of values according to the first weight and/or the second weight, and determining whether the system is in the reference running mode according to the weighted sum.

Thus, when judging whether a system is in the reference running mode, the probability of creation of each running state in the current running mode and the reference running mode may be considered, so that a more accurate judgment result may be obtained.

In some embodiments, the judging module is used for executing one of the following:

- determining time information corresponding to each running state in the plurality of running states, and determining whether the system is in the reference running mode or not by comparing state characteristics and time information of the plurality of running states and the current running mode;
- determining a reference running mode corresponding to each preset time period, and determining whether the system is in the reference running mode or not by comparing the current running mode and the reference running mode corresponding to the same time period; and
- determining a time distribution rule of a system parameter value of the system, determining a time distribution condition of the system parameter value according to the current running data, and determining whether the system is in the reference running mode or not according to whether the time distribution condition conforms to the time distribution rule or not.

By comparing the time information of the current running mode with the time information of the running state in the reference running mode, any irregularity of the system running state in time may be detected, so as to facilitate the handling of irregular running of the system.

In some embodiments, the system-state monitoring device may further comprise:

- a storage module comprising a first storage space and a second storage space, the first storage space being larger than the second storage space;
- a data acquisition module, used for storing running data of the system in the first storage space and the second storage space, respectively; when the first storage space is full, storing running data in the first storage space is stopped, and the reference mode determining module is triggered to determine the reference running mode by using the running data in the first storage space; when the second storage space is full and the reference running mode exists, the current mode determining module is triggered to determine the current running mode by using the running data in the second storage space;
- wherein the judging module is further used for, when it is determined that the system is not in the reference running mode, sending out alarming information and emptying the first storage space.

By storing historical running data and current running data in two storage spaces of different sizes respectively and, when a storage space has become full, triggering the determination process of the corresponding running mode, no timer needs to be used and thus the implementation is simpler.

In some embodiments, the reference mode determining module may be used to execute one of the following:

- clustering a plurality of running state examples corresponding to the unit time period in historical running data of the system to obtain a plurality of clusters, and calculating a running state for each cluster in the plurality of clusters to serve as one running state in the plurality of running states; and
- building a matrix by utilizing the plurality of running state examples corresponding to the unit time period in the historical running data of the system, and performing dimensionality reduction on the matrix by utilizing singular value decomposition or main component analysis to obtain the plurality of running states.

By comparing the time information of the current running mode with the time information of the running state in the reference running mode, any irregularity of the system running state in time may be detected, so as to facilitate the handling of irregular running of the system.

At least some embodiments further provide a system-state monitoring device, comprising: a processor and a storage, the storage storing a computer-readable instruction enabling the processor to execute the method of at least some embodiments.

A system-state monitoring device of at least some embodiments determines a plurality of usual running states of a monitored system as a reference running mode and, by comparing the current running mode of the system with the reference running mode, determines whether the system is in the reference running mode; thus, a change in a running rule of the system may be detected; therefore, the monitored system or a peripheral matched mechanism may be adjusted conveniently in a timely manner, and performance of the system is improved.

At least some embodiments further provide a computer-readable storage medium storing a computer-readable instruction that enables a processor to execute the method of at least some embodiments.

The storage medium of at least some embodiments can enable a processor to determine a plurality of usual running states of a monitored system as a reference running mode and, by comparing the current running mode of the system with the reference running mode, determine whether the system is in the reference running mode; thus, a change in a running rule of the system may be detected; therefore, the monitored system or a peripheral matched mechanism may be adjusted conveniently in a timely manner, and performance of the system is improved.

In order to further clarify the objective, technical solution, and benefits of example embodiments, at least some example embodiments will be described below in greater detail with reference to embodiments.

An embodiment of the present application provides a technical solution for system-state monitoring, which allows the determination of a reference running mode of a system, the reference running mode comprising a plurality of running states of the system within a unit time period; and allows the determination of whether the system is in the reference running mode by comparing the reference running mode with the current running mode. FIG. 1 is a schematic diagram for an application scenario of an embodiment of the present application. This application scenario is only an example of various possible application scenarios, and technical solutions provided by at least some embodiments may also be applied to other scenarios. As shown in FIG. 1, this scenario may include a system-state monitoring device 12, a network 11, a sensor 13, and a monitored system 14.

The network 11 can maintain the communication between the system-state monitoring device 12, the sensor 13, and the monitored system 14. The network 11 may be a wired or wireless network running any communication protocol.

The monitored system 14 may be a collection of devices or components that operate to implement a certain function. The monitored system 14 may comprise one or more devices (such as a mechanical device and a chemical device) and may also comprise one or more components, such as a motor and bearings.

The sensor 13 may be one of various contact or non-contact detection devices. The sensor 13 may be selected from various devices, including voltage sensors, current sensors, displacement sensors, and rotational speed sensors, that detect parameters in various fields, such as sound, light, electricity, magnetism, heat, and force.

The system-state monitoring device 12 can, through the network 11, obtain running data of the monitored system 14 provided by the sensor 13 and/or the monitored system 14, and analyze the running data by the method of at least some embodiments, thereby determining whether the running state of the monitored system 14 is normal.

In some embodiments, the system-state monitoring device 12 may comprise a processor 121 and a running database 124. The running database 124 can store running data of the monitored system 14. The processor 121 may be one or a plurality of processors, and may be provided in one or a plurality of physical devices. The processor 121 may analyze running data to determine whether the running condition of the monitored system 14 is normal.

Figure 2A:
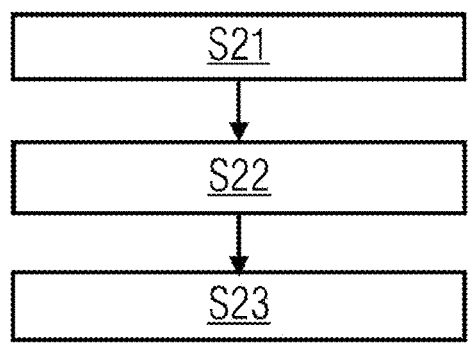
FIG. 2A shows a flowchart for a system-state monitoring method according to at least one embodiment of the present application.

FIG. 2A shows a flowchart for a system-state monitoring method according to an embodiment of the present application. This method may be executed by the system-state monitoring device 12 shown in FIG. 1. The method may comprise the following steps:

Step S21: determining a reference running mode of a system, wherein the reference running mode comprises a plurality of running states of the system within a unit time period;

Step S22: determining a current running mode of the system according to current running data of the system; and Step S23: determining whether the system is in the reference running mode or not by comparing the current running mode and the reference running mode.

A system mentioned herein may be any one device or a collection of a plurality of devices; for example, it may be the monitored system 14 shown in FIG. 1.

A running state refers to the performance of a system when it is running, which may be determined according to the value of one or more parameters obtained when the system is running. For example, a running state may be the value of a parameter of the system, for example, a voltage, a current, or a rotation speed. For another example, a running state may be a value calculated on the basis of the values of a plurality of parameters, such as comprehensive energy consumption and overall equipment efficiency (OEE).

A unit time period may be any length of time period, which may be set as needed; for example, it may be set to several hours, one day, several days, one week, several weeks, one month, several months, etc.

Since a system may have a plurality of different running states according to order requirements, operating conditions, etc., different running states correspond to different distributions of system parameters in time. Even if parameters remain within the normal range, a running state of the system may be constantly changing. A reference running mode refers to a running pattern exhibited during normal running of a system. A reference running mode may be obtained from historical running data of the system, or may be set manually.

A reference running mode may comprise a plurality of different running states, such as a plurality of running states reached when the system is running under different loads. Each running state may be represented by graphs, functions or other forms. For example, a running state may be represented by a distribution curve graph, a line graph, a histogram, etc. of values of system parameters within a unit time period. For another example, a running state may be represented by one function or a combination of a plurality of functions by function fitting, etc. In other examples, running states may also be represented in other forms.

Figure 2B:
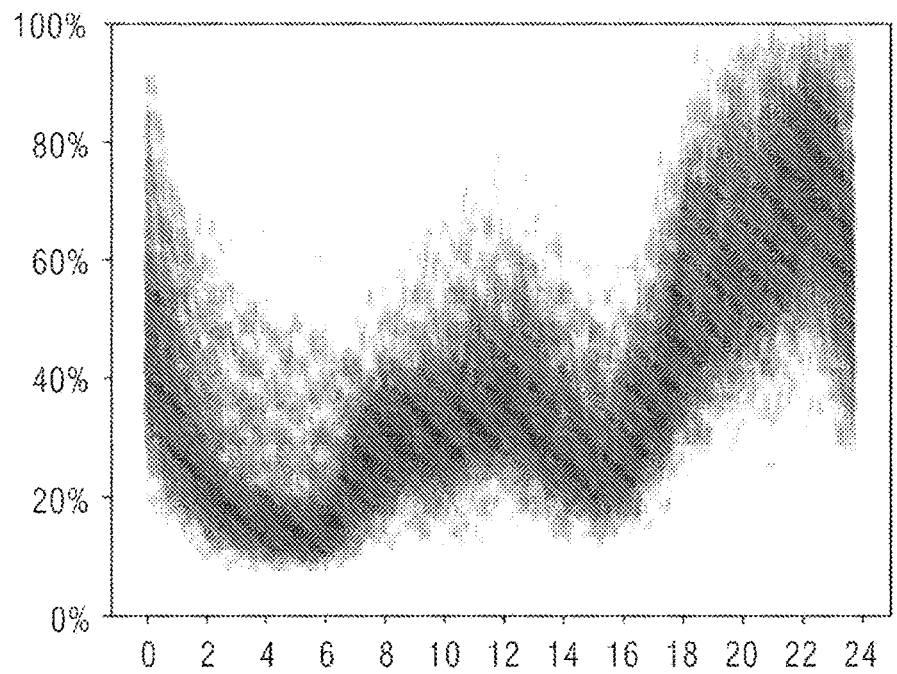
FIGS. 2B and 2C show schematic diagrams for obtaining various running state curves according to historical running data in at least one embodiment of the present application.
Figure 2C:
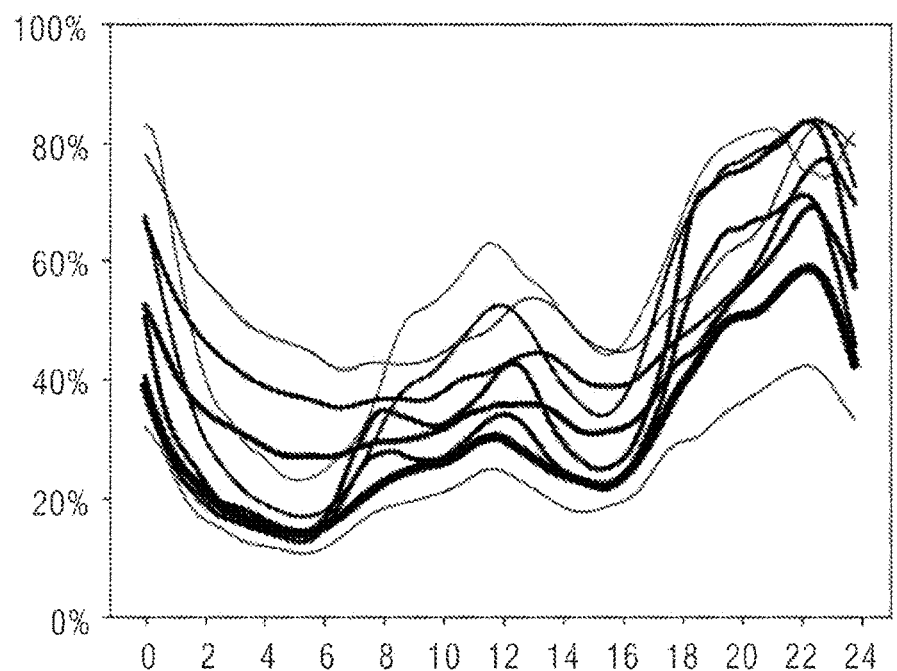

In at least some embodiments, a plurality of different running states comprised in a reference running mode may be obtained by performing various analyses on historical running data of the system. For example, it is possible to cluster a plurality of running state examples corresponding to the unit time period in historical running data of the system to obtain a plurality of clusters, and calculate a running state for each cluster in the plurality of clusters to serve as one running state in the plurality of running states. A running state instance refers to an actual running state comprised in collected running data. Optional clustering algorithms may include K-means, K-medoids, and hierarchical clustering. For another example, it is possible to build a matrix by utilizing the plurality of running state examples corresponding to the unit time period in the historical running data of the system, and perform dimensionality reduction on the matrix by utilizing singular value decomposition or main component analysis to obtain the plurality of running states. Other methods may also be used in other embodiments, and no similar descriptions will be provided again herein. For example, when running states are represented by graphs, FIGS. 2B and 2C show schematic diagrams for obtaining various running state curves according to historical running data in an embodiment of the present application. In FIG. 2B, a unit time period is measured in days, and each curve reflects the distribution of the running state of a day in the historical running data, which is called a running state instance. FIG. 2C shows several running state curves obtained by analyzing and processing the running state curves in FIG. 2B, which serve as a reference running mode.

Current running data refer to the running data of the system collected in the data collection period closest to the time for determining the current running mode. In at least some embodiments, it is possible to set a fixed or variable data collection period as needed, for example, several days, one week, several weeks, one month, several months, etc., and, after the end of each data collection period, determine the current running mode by using the running data collected during the period. The current running mode may comprise one or more running states. For example, when the data collection period comprises several days, these days may all correspond to the same running state, or, of these days, a plurality of days correspond to a first running state, a plurality of days correspond to a second running state, a plurality of days correspond to a third running state, and so on. The form and determination method of a running state in the current running mode are similar to the above-mentioned form and determination method of a running state in the reference running mode, and no similar descriptions will be provided again herein.

Here, comparing the current running mode and the reference running mode involves the comparison of two sets of running states, with the purpose of judging whether the current running mode conforms to the reference running mode. If the current running mode conforms to the reference running mode, then it indicates that the system is in the reference running mode; otherwise, it indicates that the system is not in the reference running mode; in other words, the system has deviated from its usual running mode and is in a running state that is significantly different from usual running state.

For example, the monitored system 14 is a factory with 3 production lines, the system-state monitoring device 12 is installed in a power supply enterprise, and the sensor 13 is installed in a power distribution device for supplying power to the monitored system 14 to collect running parameter values of the power distribution device. The system-state monitoring device 12 is provided with a reference running mode based on the monitored system 14, comprising a plurality of previous running states of the monitored system 14, such as a first running state of the factory during a busy period, a second running state during a usual period, and a third running state during an idle period. Each running state may be a distribution rule of the running parameter values of the power distribution device within a unit time period. The system-state monitoring device 12 determines the current running mode of the monitored system 14 according to the running data of the monitored system 14 collected in the previous data collection period. When the factory adds 2 new production lines in order to increase production, by comparing the current running mode and the reference running mode, the system-state monitoring device 12 can determine that the current running mode matches none of the three running modes in the reference running mode, and so it is determined that the monitored system 14 is not in the reference running mode. Accordingly, the power supply enterprise can handle the situation based on a monitoring result (for example, an alarm message) obtained by the system-state monitoring device 12; for example, it can increase the power supply to the factory, replace the power distribution device with one having higher power, etc., which helps to improve the performance of the monitored system 14.

In at least one embodiment, a plurality of usual running states of a monitored system are determined as a reference running mode and, by comparing the current running mode of the system with the reference running mode, whether the system is in the reference running mode is determined; thus, a change in a running rule of the system may be detected; therefore, the monitored system or a peripheral matched mechanism may be adjusted conveniently in a timely manner, and performance of the system is improved.

In at least some embodiments, running states of a system may be represented by graphs, functions or other forms. Examples will be given below. For example, when running states of the system are represented with graphs, the reference running mode may comprise a plurality of first state distribution graphs corresponding to a plurality of running states, and the current running mode may comprise at least one second state distribution graph. A state distribution graph is a graphical representation of the distribution of running parameter values of a system within a unit time period. A first state distribution graph and a second state distribution graph are only intended for distinguishing between respective state distribution graphs of a reference running mode and a current running mode, and neither "first" nor "second" has any substantial meaning. The same is also true of the other instances of "first", "second", "third", etc. below, and no similar descriptions will be provided again herein. In step S23 described above, a plurality of first state distribution graphs may be used as a first graph group, at least one second state distribution graph may be used as a second graph group, a similarity measuring value of the first graph group and the second graph group may be determined, and whether the system is in the reference running mode may be determined according to the similarity measuring value. A similarity measuring value is used to indicate the degree of similarity between a first graph group and a second graph group. In some examples, the degree of similarity between two groups of graphs may be calculated, and the degree of similarity may be used as the above-described similarity measuring value. In other examples, the degree of difference between two groups of graphs may be calculated as the above-described similarity measuring value. In at least some embodiments, a similarity measuring value may be compared with a preset threshold value, and whether the system is in the reference running mode may be determined according to the comparison result. For example, assuming that the similarity measuring value is a degree of similarity, when the similarity measuring value is greater than the threshold value, it may be determined that the system is in the reference running mode; assuming that the similarity measuring value is a degree of difference, when the similarity measuring value is smaller than the threshold value, it may be determined that the system is in the reference running mode.

Thus, by transforming the comparison between a current running mode and a reference running mode into comparison of the similarity between two groups of graphs, various graph processing methods may be used to determine whether the system is in the reference running mode.

When determining a similarity measuring value of the first graph group and the second graph group, various graph distance algorithms, such as Euclidean distance, Hausdorff distance, and Frechet distance, may be used.

As mentioned earlier, the purpose of comparing the current running mode and the reference running mode is to determine whether the current running mode conforms to the reference running mode. Therefore, when determining a similarity measuring value of the first graph group and the second graph group, for each second state distribution graph in the second graph group, the graph most similar thereto in the first graph group may be searched; in other words, a third state distribution graph in the first graph group that is most similar to the second state distribution graph is determined, and a graph similarity measuring value of the second state distribution graph and the third state distribution graph is obtained. Thus, by using the graph similarity measuring values of each second state distribution graph and its corresponding third state distribution graph, a measuring value set corresponding to the second graph group may be obtained, and thus the measuring value set is used to determine a similarity measuring value of the first graph group and the second graph group.

By determining the graphs in the second graph group that are most similar in the first graph group, a measuring value set corresponding to the second graph group is obtained according to the graph similarity measuring value; the measuring value set represents how close each running state graph in the current running mode is to the reference running mode; this allows a reduction of the computational complexity, facilitating subsequent processing.

In at least some embodiments, various analysis methods may be used to process the measuring value set, so as to obtain a similarity measuring value of the first graph group and the second graph group.

In some embodiments, an extreme value (for example, a maximum value, a minimum value, etc.) in a measuring value set may be selected as a similarity measuring value of the first graph group and the second graph group. For example, when the measuring value set is the maximum similarity corresponding to each running state graph (that is, the degree of similarity to the most similar running state graph in the first graph group), the minimum value may be selected from the measuring value set (that is, the lowest degree of similarity) as the similarity measuring value of the first graph group and the second graph group. For another example, when the measuring value set is the minimum value of the degree of difference corresponding to each running state graph (that is, the degree of difference from the most similar running state graph in the first graph group), the maximum value may be selected from the measuring value set (that is, the lowest degree of similarity) as the similarity measuring value of the first graph group and the second graph group.

In some embodiments, a plurality of values may be selected from a measuring value set, and the mean value of the plurality of values may be used as the similarity measuring value of the first graph group and the second graph group.

In some embodiments, a plurality of values may be selected from a measuring value set, and the sum of the plurality of values may be used as the similarity measuring value of the first graph group and the second graph group.

When selecting a plurality of values from a measuring value set, it is possible to sort the values in the measuring value set by a preset sorting method, and select a plurality of values in order; for example, N of the first N values may be selected, or several values greater than or smaller than a preset threshold value may be selected.

The description given above is only an example; in other embodiments, a similarity measuring value of the first graph group and the second graph group may also be determined by adopting other strategies.

By selecting some values from a measuring value set to determine the similarity measuring value between a first graph group and a second graph group, the computational complexity may be further reduced, and the computation efficiency may be improved.

Figure 3A:
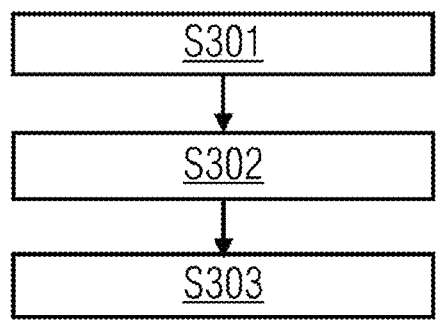
FIGS. 3A and 3B show flowcharts for a state monitoring method according to at least one embodiment of the present application.
Figure 3B:
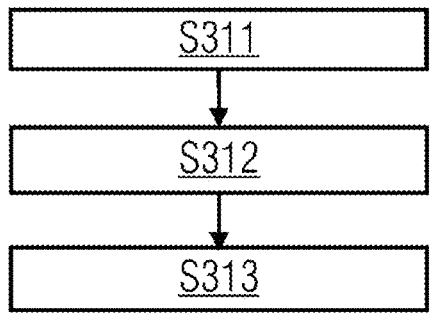

In at least some embodiments, the number and frequency of creations of various running states vary; in other words, some running states are relatively common, while some others are relatively rare. Therefore, when determining a reference running mode and/or a current running mode, the weight of each running state may be determined, and the weight of the running state may be considered when comparing the reference running mode and the current running mode. FIGS. 3A and 3B show flowcharts for a state monitoring method according to an embodiment of the present application, which may be executed by the system-state monitoring device 12. FIG. 3A shows an embodiment in which the weight of each running state in the reference running mode is considered. As shown in FIG. 3A, the method may comprise the following steps:

Step S301: determining a first weight of each first state distribution graph in a plurality of first state distribution graphs.

In some examples, a first weight may be determined according to the probability of creation of a running state corresponding to a first state distribution graph. For example, historical running data of a system may be analyzed; for example, historical running states may be clustered, and each first state distribution graph and its first weight may be obtained according to methods such as the number of running state instances in each cluster.

Step S302: determining a third state distribution graph most similar to the second state distribution graph in the first graph group for each second state distribution graph in the second graph group, calculating a graph similarity measuring value of the second state distribution graph and the third state distribution graph, and obtaining a measuring value set corresponding to the second graph group according to the graph similarity measuring value; and Step S303: determining whether the system is in a reference running mode by using the measuring value set and the first weight.

For example, when the similarity between graphs is used as the graph similarity measuring value, it is assumed that the second graph group comprises graph 1 and graph 2, graph 1 is the most similar to graph 3 in the first graph group, with a degree of similarity of 0.9, and the weight of graph 3 is 0.6; graph 2 is the most similar to graph 4 in the first graph group, with a degree of similarity of 0.3, and the weight of graph 3 is 0.2; then, the weighted graph similarity of graph 1 is 0.48, and the weighted graph similarity of graph 2 is 0.06. Therefore, in the process of determining whether the system is in a reference running mode, although the degree of conformity of graph 2 to the reference running mode is low, since the weight of graph 4 is small, the influence of graph 2 on the final result is much less significant than that of graph 1.

Thus, in the process of judging whether the system is in a reference running mode, considering the probability of creation of the current running state in the corresponding running state in the reference running state, the degree of similarity in the current running state to the high-weighted running state in the reference running state may be caused to have a more significant influence on a result than the degree of similarity to the lower-weighted running state in the reference running state, so that a more accurate judgment result may be obtained.

FIG. 3B shows an embodiment in which the weight of each running state in the current running mode is considered. As shown in FIG. 3B, the method may comprise the following steps:

Step S311: determining a second weight of each second state distribution graph in the at least one second state distribution graph according to the current running data;

Step S312: determining a third state distribution graph most similar to the second state distribution graph in the first graph group for each second state distribution graph in the second graph group, calculating a graph similarity measuring value of the second state distribution graph and the third state distribution graph, and obtaining a measuring value set corresponding to the second graph group according to the graph similarity measuring value; and Step S313: determining whether the system is in the reference running mode by using the measuring value set and the second weight.

For example, when the similarity between graphs is used as the graph similarity measuring value, it is assumed that the second graph group comprises graph 1 and graph 2, graph 1 is the most similar to graph 3 in the first graph group, with a degree of similarity of 0.9, and the weight of graph 1 is 0.7; graph 2 is the most similar to graph 4 in the first graph group, with a degree of similarity of 0.3, and the weight of graph 2 is 0.3; then, the weighted graph similarity of graph 1 is 0.63, and the weighted graph similarity of graph 2 is 0.09. Therefore, in the process of determining whether the system is in a reference running mode, although the degree of conformity of graph 2 to the reference running mode is low, since its weight is small, the influence of graph 2 on the final result is much less significant than that of graph 1.

Thus, in the process of judging whether the system is in a reference running mode, considering the probability of creation of each running state in the current running state, the degree of similarity of the high-weighted running state in the current running state may be caused to have a more significant impact on a result than the degree of similarity of the low-weighted running state, so that a more accurate judgment result may be obtained.

In at least some embodiments, the first weight and the second weight may also be used at the same time to determine whether the system is in the reference running mode.

In some examples, the first weight and/or the second weight may be used to weight each value in a measuring value set to obtain a weighted value of each value, and whether the system is in the reference running mode may be determined according to the extreme value among the weighted values. For example, when the graph similarity measuring value is the degree of similarity, the weighted minimum value may be used to determine whether the system is in the reference running mode; when the graph similarity measuring value is the degree of difference, the weighted maximum value may be used to determine whether the system is in the reference running mode.

In some examples, a plurality of values may be selected from a measuring value set, a weighted average of the plurality of values may be calculated according to the first weight and/or the second weight, and whether the system is in the reference running mode is determined according to the weighted average.

In some examples, a plurality of values may be selected from the measuring value set, a weighted sum of the plurality of values may be calculated according to the first weight and/or the second weight, and whether the system is in the reference running mode is determined according to the weighted sum.

In the process of selecting a plurality of values from a measuring value set, the values in the measuring value set may be sorted according to a preset sorting method, and the plurality of values may be selected in order; for example, N of the first N values may be selected, or several values may be selected in proportion to a preset number, etc. The above-mentioned extreme value, or weighted average value, or weighted sum may be compared with a preset threshold value, and whether the system is in the reference running mode is determined according to the comparison result.

Thus, when judging whether a system is in the reference running mode, the probability of creation of each running state in the current running mode and the reference running mode may be considered, so that a more accurate judgment result may be obtained.

In some embodiments, the creation of running states follows a strict time rule; therefore, time information of the current running mode may be used to further verify whether the system is in the reference running mode.

In some examples, it is possible to determine time information corresponding to each running state in the plurality of running states in a reference running mode, and determine whether the system is in the reference running mode or not by comparing state characteristics and time information of the plurality of running states and the current running mode. State characteristics refer to information used to distinguish between running states, such as running state graphs and fitting functions for running states. Time information corresponding to a running state is information characterizing the time at which the system is in the running state. In some examples, time information may be information about a time period, for example, from January to March or from May 10 to July 20. In some examples, time information may be an array or a curve, which represents the probability of creation of a running state within a period of time. The description given above is only an example; in other embodiments, time information may be expressed in other forms. When time information is an array, the dimension of the array is determined by a statistical period and a change unit time period. For example, if the statistical period is 1 year and the change unit time period is 1 month, then the time information may be a 12-dimensional array, where each value represents the probability of creation of this running state in the corresponding month. A statistical period and a change unit time period may be set according to actual situations; for example, the statistical period may be several months, and the change unit time period may be several days. When the time information is a curve, the curve is a curve continuous in the time dimension; the first dimension of the curve is a statistical period (for example, several months) and the second dimension is the probability of creation of a running state.

In some examples, when comparing the time information of the current running mode with the plurality of running states, it is possible to find the most similar running state (hereinafter referred to as the third running state) in the reference running mode for each running state (hereinafter referred to as the first running state) in the current running mode, compare the time information corresponding to the first running state and the third running state, and judge the degree of conformity between the time information of the two states; if the information does not match, it may be determined that the current running mode of the system does not match the reference running mode in time.

For example, when the time information is a time period, if the time period corresponding to the current first running state falls within the time period corresponding to the third running state, then it may be determined that the first running state matches the reference running mode in time; otherwise, it may be determined that the first running state does not match the reference running mode in time.

For another example, in the process of comparing time information, according to the time information corresponding to the current first running state, a period of the corresponding time may be intercepted from the time information corresponding to the third running state, and then the information may be compared. For example, if the time information corresponding to the current first running state is from September 15 to November 15, then the array or curve corresponding to the period from September 15 to November 15 is intercepted from the time information corresponding to the third running state, and then data or curve similarity is compared to determine the degree of conformity in time information.

After the degree of conformity of time information is determined, in combination with the similarity comparison results of the state characteristics of the running state, whether the system is in the reference running mode may be determined according to a preset strategy. For example, a preset strategy may be that the state characteristics of each running state in the current running mode conform to a running state in the reference running mode (for example, the graph similarity measuring value satisfies a preset condition), and that the time information conforms to the running state (for example, the degree of conformity in time is greater than a preset threshold value). For example, a preset strategy may be that the degree of conformity of the state characteristics corresponding to each running state in the current running mode and the degree of conformity of the time information are respectively weighted according to a preset weight, and whether the system is in the reference running mode is determined on the basis of a calculation result. The description given above is only an example, and other methods may also be adopted in other embodiments as needed.

In other examples, it is possible to determine the reference running mode corresponding to each preset time period, and determine whether the system is in the reference running mode by comparing the current running mode with the reference running mode corresponding to the same time period. For example, the reference running mode corresponding to each time period may be determined according to a preset time period (for example, several days, several weeks, or several months). According to the time period corresponding to the current running mode, the reference running mode of the same time period is compared with the current running mode according to the method of at least some embodiments to determine whether the state characteristics and time information of the current running mode conform to those of the reference running mode; if yes, then it is determined that the system is in the reference running mode.

In some other examples, a time distribution rule of a system parameter value of the system may be determined, the time distribution of the system parameter value may be determined according to the current running data, and whether the system is in the reference running mode may be determined according to whether the time distribution conforms to the time distribution rule. For example, the extreme value or average value of a system parameter value within a unit time period may be determined, and the time distribution rule of the extreme value or average value may be determined as the time distribution rule of the system parameter value, such as a curve or an array. The time distribution of the system parameter value in the current running mode is determined in a similar manner, and the time distribution is compared with the above-mentioned time distribution rule to determine the degree of conformity of the time information. Then, in combination with the similarity comparison results of the state characteristics of the running state, whether the system is in the reference running mode may be determined according to a preset strategy. The specific method is the same as that described above and no similar descriptions will be provided again herein.

By comparing the time information of the current running mode with the time information of the running state in the reference running mode, any irregularity of a running state of the system may be detected in a timely manner, which facilitates the handling of irregular running of the system.

In at least some embodiments, the reference running mode of the system may be determined on the basis of historical running data of the system, and the current running mode may be determined on the basis of the running data of the system collected within the recent period of time (that is, current running data). In order to ensure that the reference running mode is more accurate, the time span of historical running data is generally relatively wide. In order to enable the current running mode to reflect the current running conditions of the system, the time span of the current running data is narrower. In other words, the first duration of collecting historical running data is generally longer than the duration of collecting current running data.

In some examples, historical running data and current running data may be collected separately according to a preset collection period. For example, a collection period of historical running data may be several months, several years, etc., and a collection period of current running data may be several days, several weeks, several months, etc.

In other examples, a pre-allocated data storage space may be used to control the data volume of historical running data and that of current running data. For example, running data of a system may be obtained, and the running data may be stored in a first storage space and a second storage space, respectively, the first storage space being larger than the second storage space. The first storage space may be a hard disk space, a cache space, etc. The first storage space is used for storing historical running data; when the first storage space is full, storing running data in the first storage space is stopped, and the running data in the first storage space is used to determine a reference running mode; when it is determined that the system is not in a reference running mode, an alarm message is sent out and the first storage space is cleared. Similarly, the second storage space may be a hard disk space, a cache space, etc. The first storage space is used for storing current running data; when the second storage space is full and a reference running mode exists, the running data in the second storage space may be used to determine a current running mode.

By storing historical running data and current running data in two storage spaces of different sizes respectively and, when a storage space has become full, triggering the determination process of the corresponding running mode, no timer needs to be used and thus the implementation is simpler.

Figure 4A:
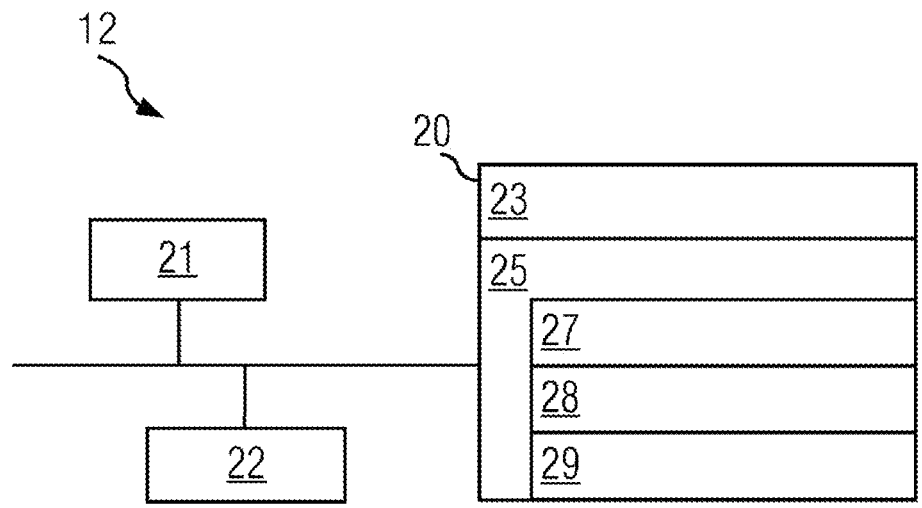
FIGS. 4A and 4B show schematic diagrams for a system-state monitoring device according to at least one embodiment of the present application.
Figure 4B:
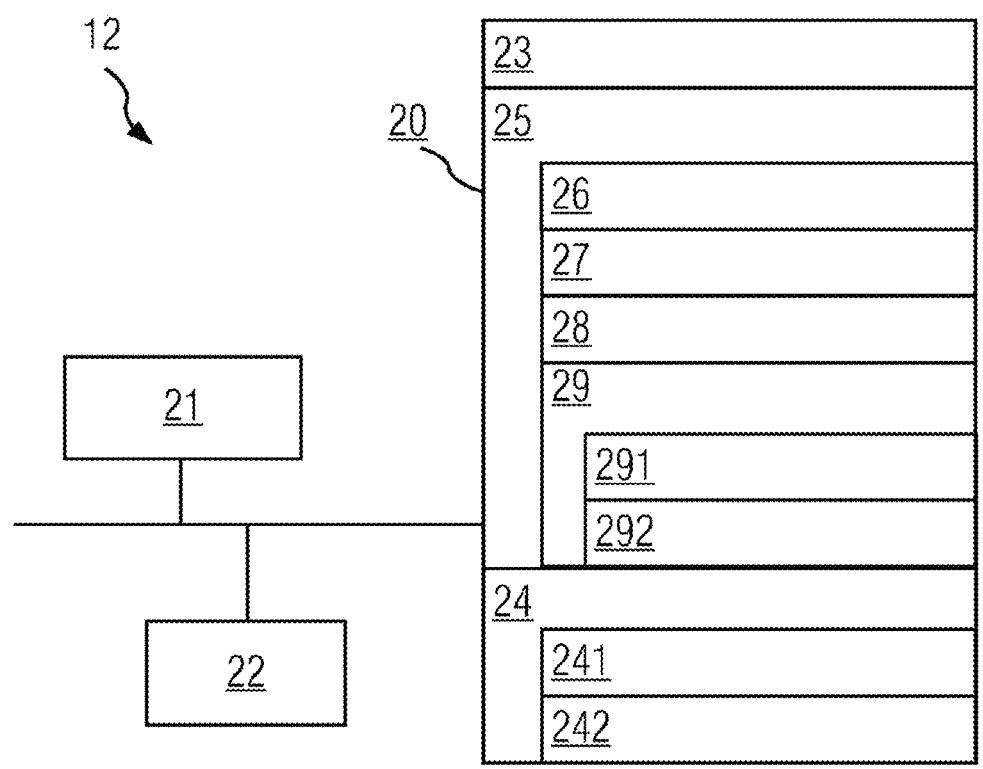

The system-state monitoring method of at least some embodiments may be executed by the system-state monitoring device 12. FIGS. 4A and 4B are schematic diagrams for the system-state monitoring device 12 according to an embodiment of the present application. As shown in FIG. 4A, the system-state monitoring device 12 may comprise: a reference mode determining module 27, a current mode determining module 28, and a judging module 29.

The reference mode determining module 27 may determine a reference running mode of the system, wherein the reference running mode comprises a plurality of running states of the system within a unit time period.

The current mode determining module allows a current running mode of a system to be determined according to the current running data of the system.

The judging module 29 can determine whether the system is in a reference running mode by comparing a current running mode with a reference running mode.

The system-state monitoring device 12 of at least some embodiments determines a plurality of usual running states of a monitored system as a reference running mode and, by comparing the current running mode of the system with the reference running mode, determines whether the system is in the reference running mode; thus, a change in a running rule of the system may be detected; therefore, the monitored system or a peripheral matched mechanism may be adjusted conveniently in a timely manner, and performance of the system is improved.

In some embodiments, as shown in FIG. 4B, the judging module 29 may comprise: a similarity determining unit 291 and a judging unit 292. The similarity determining unit 291 may, using a plurality of first state distribution graphs corresponding to a plurality of running states as a first graph group, and using at least one second state distribution graph corresponding to the current running mode as a second graph group, determine the similarity measuring value of the first graph group and the second graph group. The judging unit 292 may determine whether the system is in a reference running mode according to the similarity measuring value. Thus, by transforming the comparison between a current running mode and a reference running mode into the comparison of similarity between two groups of graphs, the system-state monitoring device 12 can use various graph processing methods to determine whether the system is in the reference running mode, which is relatively simpler to implement.

In some embodiments, when determining the similarity measuring value of the first graph group and the second graph group, the similarity determining unit 291 may determine a third state distribution graph most similar to the second state distribution graph in the first graph group for each second state distribution graph in the second graph group, calculate a graph similarity measuring value of the second state distribution graph and the third state distribution graph, and obtain a measuring value set corresponding to the second graph group according to the graph similarity measuring value; and determine a similarity measuring value of the first graph group and the second graph group by using the measuring value set. By determining the graphs in the second graph group that are most similar in the first graph group, and determining the closeness of each running state graph in the current running mode to the reference running mode according to its graph similarity measuring value, the computation load on the similarity determining unit 291 is reduced.

In some embodiments, when processing the measuring value set, the judging unit 292 may execute one of the following:

selecting an extreme value in the measuring value set as the similarity measuring value of the first graph group and the second graph group;

selecting a plurality of values from the measuring value set, and using the mean value of the plurality of values as the similarity measuring value of the first graph group and the second graph group; and selecting a plurality of values from the measuring value set, and using the sum of the plurality of values as the similarity measuring value of the first graph group and the second graph group.

By selecting some values from the measuring value set to determine the similarity measuring value of the first graph group and the second graph group, the computation load on the system-state monitoring device 12 may be further reduced, and the calculation efficiency may be improved.

In some embodiments, the weight of each running state may be taken into consideration when comparing a reference running mode with a current running mode. For example, the reference mode determining module 27 may also determine a first weight of each first state distribution graph in a plurality of first state distribution graphs according to historical running data. For another example, the current mode determining module 28 may also determine a second weight of each second state distribution graph in the at least one second state distribution graph according to the current running data. The judging module 29 can determine a third state distribution graph most similar to the second state distribution graph in the first graph group for each second state distribution graph in the second graph group, calculate a graph similarity measuring value of the second state distribution graph and the third state distribution graph, and obtain a measuring value set corresponding to the second graph group according to the graph similarity measuring value; and determine whether the system is in the reference running mode or not according to the measuring value set and the first weight and/or the second weight. By taking the weight of each running state into consideration, the judging module 29 may obtain a more accurate judgment result.

In some embodiments, when determining whether a system is in a reference running mode by using a first weight and/or a second weight, the judging module 29 may execute one of the following:

weighting each value in the measuring value set with the first weight and/or the second weight to obtain a weighted value of each value, and determining whether the system is in the reference running mode according to the extreme value in the weighted values;

selecting a plurality of values from the measuring value set, calculating a weighted average of the plurality of values according to the first weight and/or the second weight, and determining whether the system is in the reference running mode according to the weighted average; and selecting a plurality of values from the measuring value set, calculating a weighted sum of the plurality of values according to the first weight and/or the second weight, and determining whether the system is in the reference running mode according to the weighted sum.

Thus, when judging whether a system is in the reference running mode, the probability of creation of each running state in the current running mode and the reference running mode may be considered, so that a more accurate judgment result may be obtained.

In some embodiments, time information of the current running mode may be used to further verify whether the system is in the reference running mode. The judging module 29 can execute one of the following:

determining time information corresponding to each running state in the plurality of running states, and determining whether the system is in the reference running mode or not by comparing state characteristics and time information of the plurality of running states and the current running mode;

determining a reference running mode corresponding to each preset time period, and determining whether the system is in the reference running mode or not by comparing the current running mode and the reference running mode corresponding to the same time period; and determining a time distribution rule of a system parameter value of the system, determining a time distribution condition of the system parameter value according to the current running data, and determining whether the system is in the reference running mode or not according to whether the time distribution condition conforms to the time distribution rule or not.

By comparing the time information of the current running mode with the time information of the running state in the reference running mode, any irregularity of a running state of the system may be detected in a timely manner, which facilitates the handling of irregular running of the system.

In some embodiments, as shown in FIG. 4B, the system-state monitoring device 12 may further comprise: a storage module 24 and a data acquisition module 26.

The storage module 24 may comprise a first storage space 241 and a second storage space 242, wherein the first storage space 241 is larger than the second storage space 242.

The data acquisition module 26 can store running data of the system in the first storage space 241 and the second storage space 242, respectively; when the first storage space 241 is full, storing running data in the first storage space 241 is stopped, and the reference mode determining module is triggered to determine a reference running mode by using the running data in the first storage space 241; when the second storage space 242 is full and a reference running mode exists, the current mode determining module is triggered to determine a current running mode by using the running data in the second storage space 242.

The judging module 29 may also send out an alarm message and clear the first storage space 241 when it is determined that the system is not in a reference running mode.

By storing historical running data and current running data in two storage spaces of different sizes respectively and, when a storage space has become full, triggering the determination process of the corresponding running mode, no timer needs to be used and thus the implementation is simpler.

In some embodiments, when determining a reference running mode, the reference mode determining module 27 may execute one of the following:

clustering a plurality of running state examples corresponding to the unit time period in historical running data of the system to obtain a plurality of clusters, and calculating a running state for each cluster in the plurality of clusters to serve as one running state in the plurality of running states; and building a matrix by utilizing the plurality of running state examples corresponding to the unit time period in the historical running data of the system, and performing dimensionality reduction on the matrix by utilizing singular value decomposition or main component analysis to obtain the plurality of running states.

After the above-described processing, a large number of running state instances may be simplified into a few running states, which facilitates the subsequent comparison with the current running mode and allows a reduction in the implementation complexity.

In some embodiments, the system-state monitoring device 12 may further comprise a processor 21, a storage 20, and a communication module 22. The communication module 22 is used for communicating with another device through any communication network.

The storage 20 may comprise an operating system 23, a monitoring module 25, and a storage module 24. The monitoring module 25 comprises computer-readable instructions corresponding to the above-described modules.

The processor 21 can execute the computer-readable instructions in the storage 20 to implement the methods of various embodiments.

Technical solutions provided by at least some example embodiments may also be embodied as computer-readable instructions in a computer-readable storage medium.

Figure 5:
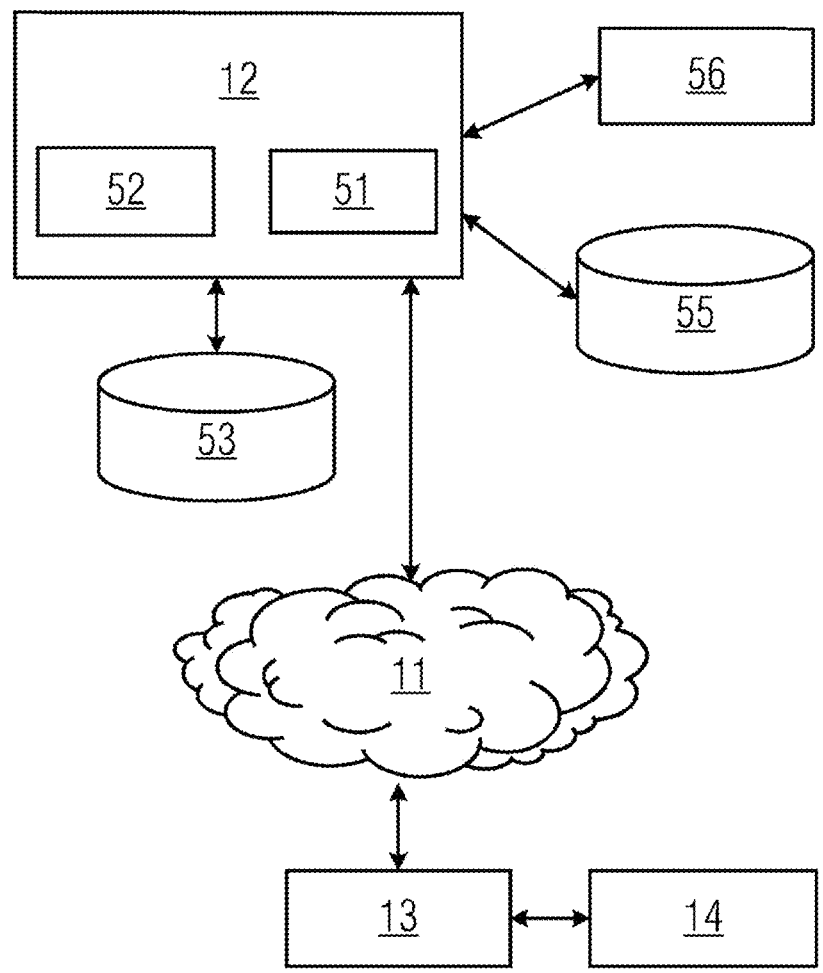
FIG. 5 shows a schematic diagram for an application scenario of at least one embodiment of the present application.

System-state monitoring solutions provided by at least some embodiments are applicable to various fields. For example, FIG. 5 shows a schematic diagram for an application scenario of an embodiment of the present application. In this application scenario, the system-state monitoring device 12 of at least some embodiments is applied in a power supply enterprise (the monitored system 14) to monitor the power consumption by each power user, so as to ensure that the power grid runs effectively and stably. The sensor 13 may be installed in a power distribution device (for example, a transformer) that supplies power to each power user, to continuously collect running data (such as voltage, current, power) of the power distribution device, and send the data to the system-state monitoring device 12.

The system-state monitoring device 12 comprises a processor 51 and a cache 52 (for example, a RAM). The processor 51 preprocesses time series data (for example, by data cleaning and data normalization), and stores preprocessed data in a database 53 to generate time series data, that is, data arranged in chronological order. The processor 51 uses a predefined mathematical model and data in the database 53 to perform modeling, and a model is stored in the cache 52. When it is determined that the system is not in a reference running mode, the system-state monitoring device 12 sends a signal to an alarm device 56; the alarm device 56 can send an alarm message to relevant personnel by email, SMS, or by any other possible method. The system-state monitoring device 12 can create a log file and store it in a log database 55.

Figure 6:
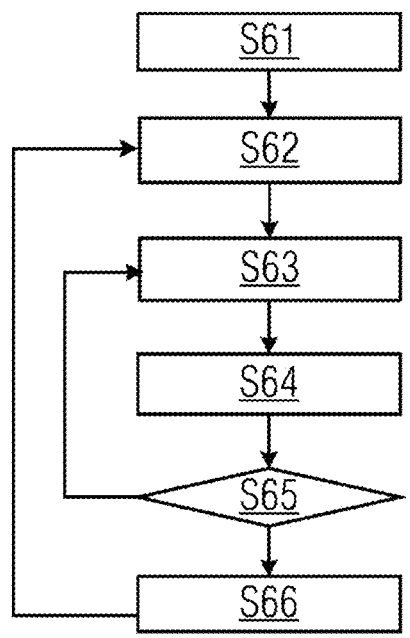
FIG. 6 shows a processing flowchart for the system-state monitoring device according to at least one embodiment of the present application.

FIG. 6 shows a processing flowchart for the system-state monitoring device 12 according to an embodiment of the present application.

In step S61, the system-state monitoring device 12 preprocesses time series data and stores preprocessed data in the first storage space and the second storage space in the database 53, respectively.

In step S62, the system-state monitoring device 12 uses the data in the first storage space to perform modeling and obtain a reference running model (that is, a mathematical model in a reference running mode).

In step S63, modeling is performed using the data in the second storage space to obtain a current running model (that is, a mathematical model in a current running mode).

In step S64, the system-state monitoring device 12 calculates the degree of similarity between the current running model and the reference running model.

In step S65, the system-state monitoring device 12 judges whether the degree of similarity is smaller than a preset threshold value; if the degree of similarity is smaller than the threshold value, then step S66 is executed; otherwise, return to step S63.

In step S66, the system-state monitoring device 12 sends a signal to the alarm device 56, writes a log to the log database 55, clears the first storage space, and returns to step S62.

Figure 7:
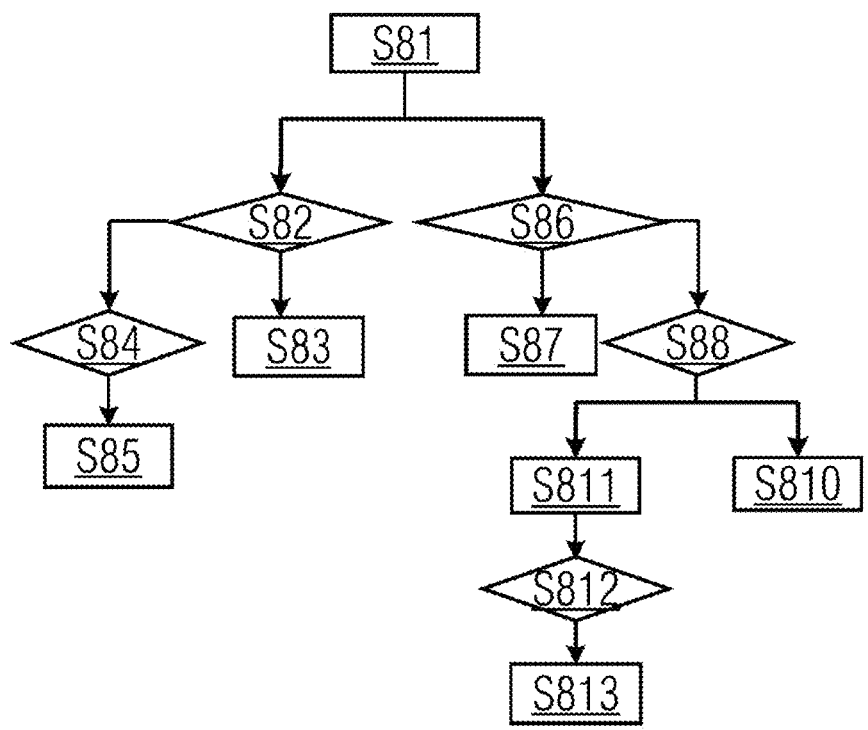
FIG. 7 shows a schematic diagram for a method for storing data in a system-state monitoring device in at least one embodiment of the present application.

FIG. 7 shows a schematic diagram for a method for storing data by the system-state monitoring device 12 in an embodiment of the present application.

The first storage space is used for storing time series data used to establish a reference running model, and the second storage space 82 is used for storing time series data used to establish a current running model.

When new time series data are generated in step S81, the system-state monitoring device 12 attempts to write data into both the first storage space and the second storage space.

For the first storage space, the system-state monitoring device 12 determines in step S82 whether the first storage space is full and, if the space is not full, writes data to the first storage space in step S83; if the space is full, then it is determined in step S84 whether a reference running model exists; if it exists, no processing is performed; otherwise, in step S85, the time series data in the first storage space are used to establish a reference running model.

For the second storage space, the system-state monitoring device 12 determines in step S86 whether the second storage space is full and, if the space is not full, writes time series data into the second storage space in step S87; if the space is full, it is determined in step S88 whether a reference running model exists. If no reference running model exists, then the stored old data are updated with the newly written data in step S810. If a reference running model exists, then the time series data in the second storage space are used to establish a current running model in step S811.

The system-state monitoring device 12 judges in step S812 whether the degree of similarity between the current running model and the reference running model is smaller than a threshold value, and if the degree of similarity is smaller than the threshold value, clears the first storage space in step S813; otherwise, no processing is performed.

While at least some example embodiments have been described above in particular with reference to preferred embodiments, it should be understood that said embodiments are not intended to limit example embodiments and that modifications, equivalent substitutions, and improvements can be made without departing from the spirit or scope of example embodiments as defined by the claims.

The invention claimed is:

1. A method for system-state monitoring, the method comprising:
   acquiring running data of a system and storing the running data in a first storage space and a second storage space, the first storage space being greater than the second storage space;
   determining a reference running mode of the system, the reference running mode including a plurality of running states of the system within a unit time period, the determining of the reference running mode of the system including, in response to the first storage space being full, stopping the storing of the running data into the first storage space and determining the reference running mode based on the running data stored in the first storage space;
   determining a current running mode of the system based on current running data of the system, the determining of the current running mode of the system including, in response to the second storage space being full and the reference running mode existing, determining the current running mode based on the running data stored in the second storage space;
   determining whether the system is in the reference running mode by comparing the current running mode with the reference running mode; and
   sending out alarming information and emptying the first storage space in response to the system being determined not to be in the reference running mode.

2. The method as claimed in claim 1, wherein the determining of whether the system is in the reference running mode includes
   determining a similarity measuring value of a first graph group including a plurality of first state distribution graphs corresponding to the plurality of running states and a second graph group including at least one second state distribution graph corresponding to the current running mode, and
   determining whether the system is in the reference running mode based on the similarity measuring value.

3. The method as claimed in claim 2, the method further comprising at least one of the following:
   determining a first weight for each of the plurality of first state distribution graphs; or
   determining a second weight for each of the at least one second state distribution graph based on the current running data, wherein
   the determining of whether the system is in the reference running mode by comparing the current running mode and the reference running mode includes
   determining a third state distribution graph for each of the at least one second state distribution graph in the second graph group, the third state distribution graph being a first state distribution graph from the first graph group which is most similar to the respective second state distribution graph in the second graph group,
   calculating a graph similarity measuring value of the third state distribution graph and the respective second state distribution graph,
   obtaining a measuring value set corresponding to the second graph group based on the graph similarity measuring value, and
   determining whether the system is in the reference running mode based on the measuring value set and at least one of the first weight or the second weight.

4. The method as claimed in claim 2, further comprising one of the following:
   determining time information corresponding to each of the plurality of running states, and determining whether the system is in the reference running mode by comparing state characteristics and the time information of each of the plurality of running states with the current running mode;
   determining a reference running mode corresponding to a time period, and determining whether the system is in the reference running mode by comparing the current running mode with the reference running mode corresponding to the time period; or
   determining a time distribution rule of a system parameter value of the system, determining a time distribution condition of the system parameter value based on the current running data, and determining whether the system is in the reference running mode based on whether the time distribution condition conforms to the time distribution rule.

5. The method as claimed in claim 1, further comprising one of the following:
  determining time information corresponding to each of the plurality of running states, and determining whether the system is in the reference running mode by comparing state characteristics and the time information of each of the plurality of running states with the current running mode;
  determining a reference running mode corresponding to a time period, and determining whether the system is in the reference running mode by comparing the current running mode with the reference running mode corresponding to the time period; or
  determining a time distribution rule of a system parameter value of the system, determining a time distribution condition of the system parameter value based on the current running data, and determining whether the system is in the reference running mode based on whether the time distribution condition conforms to the time distribution rule.

6. The method as claimed in claim 1, wherein the determining of the reference running mode of the system includes one of the following:
  clustering a plurality of running state examples corresponding to historical running data of the system in the unit time period to obtain a plurality of clusters, and calculating a running state for each of the plurality of clusters to serve as one of the plurality of running states; and
  building a matrix using the plurality of running state examples corresponding to the historical running data of the system in the unit time period, and performing dimensionality reduction on the matrix using singular value decomposition or main component analysis to obtain the plurality of running states.

7. A device for system-state monitoring, the device comprising:
  one or more processors; and
  a system memory storing executable instructions that, when executed by the one or more processors, causes the device to
    acquire running data of a system and store the running data in a first storage space and a second storage space, the first storage space being greater than the second storage space,
    determine a reference running mode of a system, the reference running mode including a plurality of running states of the system within a unit time period, the one or more processors being configured to cause the device to determine whether the system is in the reference running mode by stopping the storing of the running data into the first storage space and determining the reference running mode based on the running data stored in the first storage space in response to the first storage space being full,
    determine a current running mode of the system based on current running data of the system, the one or more processors being configured to cause the device to determine the current running mode of the system by determining the current running mode based on the running data stored in the second storage space in response to the second storage space being full and the reference running mode existing; and
    determine whether the system is in the reference running mode by comparing the current running mode with the reference running mode, and
    send out alarming information and empty the first storage space in response to the system being determined not to be in the reference running mode.

8. The device as claimed in claim 7, wherein the one or more processors is configured to cause the device to determine whether the system is in the reference running mode by
  determining a similarity measuring value of a first graph group including a plurality of first state distribution graphs corresponding to the plurality of running states and a second graph group including at least one second state distribution graph corresponding to the current running mode; and
  determining whether the system is in the reference running mode based on the similarity measuring value.

9. The device as claimed in claim 8, wherein
  the one or more processors is configured to cause the device to determine whether the system is in the reference running mode by determining a first weight for each of the plurality of first state distribution graphs based on historical running data; or
  the one or more processors is configured to cause the device to determine the current running mode of the system by determining a second weight for each of the at least one second state distribution graph based on the current running data of the system; and
  the one or more processors is configured to cause the device to determine whether the system is in the reference running mode by
    determining a third state distribution graph for each of the at least one second state distribution graph in the second graph group, the third state distribution graph being a first state distribution graph from the first graph group which is most similar to the respective second state distribution graph in the second graph group,
    calculating a graph similarity measuring value of the third state distribution graph and the respective second state distribution graph,
    obtaining a measuring value set corresponding to the second graph group based on the graph similarity measuring value, and
    determining whether the system is in the reference running mode based on the measuring value set and at least one of the first weight or the second weight.

10. The device as claimed in claim 9, wherein the one or more processors is configured to cause the device to determine whether the system is in the reference running mode by
  determining time information corresponding to each of the plurality of running states, and determining whether the system is in the reference running mode by comparing state characteristics and the time information of each of the plurality of running states with the current running mode;
  determining a reference running mode corresponding to a time period, and determining whether the system is in the reference running mode by comparing the current running mode with the reference running mode corresponding to the time period; or
  determining a time distribution rule of a system parameter value of the system, determining a time distribution condition of the system parameter value based on the current running data, and determining whether the system is in the reference running mode based on whether the time distribution condition conforms to the time distribution rule.

11. The device as claimed in claim 8, wherein the one or more processors is configured to cause the device to determine whether the system is in the reference running mode by
  determining time information corresponding to each of the plurality of running states, and determining whether the system is in the reference running mode by comparing state characteristics and the time information of each of the plurality of running states with the current running mode;
  determining a reference running mode corresponding to a time period, and determining whether the system is in the reference running mode by comparing the current running mode with the reference running mode corresponding to the time period; or
  determining a time distribution rule of a system parameter value of the system, determining a time distribution condition of the system parameter value based on the current running data of the system, and determining whether the system is in the reference running mode based on whether the time distribution condition conforms to the time distribution rule.

12. The device as claimed in claim 7, wherein the one or more processors is configured to cause the device to determine whether the system is in the reference running mode by
  determining time information corresponding to each of the plurality of running states, and determining whether the system is in the reference running mode by comparing state characteristics and the time information of each of the plurality of running states with the current running mode;
  determining a reference running mode corresponding to a time period, and determining whether the system is in the reference running mode by comparing the current running mode with the reference running mode corresponding to the time period; or
  determining a time distribution rule of a system parameter value of the system, determining a time distribution condition of the system parameter value based on the current running data of the system, and determining whether the system is in the reference running mode based on whether the time distribution condition conforms to the time distribution rule.

13. A device for system-state monitoring, the device comprising:
  at least one processor; and
  a memory storing computer-executable instructions that, when executed by the at least one processor, causes the device to perform the method as claimed in claim 1.

14. A non-transitory computer readable medium storing executable instructions that, when executed by at least one processor, causes the at least one processor to execute the method as claimed in claim 1.

15. A device for system-state monitoring, the device comprising:
  at least one processor; and
  a memory storing computer-executable instructions that, when executed by the at least one processor, causes the device to perform the method as claimed in claim 2.

16. A non-transitory computer readable medium storing executable instructions that, when executed by at least one processor, causes the at least one processor to execute the method as claimed in claim 2.

* * * * *